(12) United States Patent
Anbazhagan et al.

(10) Patent No.: US 10,360,148 B2
(45) Date of Patent: Jul. 23, 2019

(54) GENERATING A SECOND CODE FROM A FIRST CODE

(71) Applicant: HEWLETT-PACKARD DEVELOPMENT COMPANY, L.P., Houston, TX (US)

(72) Inventors: Baraneedharan Anbazhagan, Houston, TX (US); Patrick L. Gibbons, Houston, TX (US); Christopher H Stewart, Houston, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 413 days.

(21) Appl. No.: 14/892,220

(22) PCT Filed: Jul. 31, 2013

(86) PCT No.: PCT/US2013/052877
§ 371 (c)(1),
(2) Date: Nov. 19, 2015

(87) PCT Pub. No.: WO2015/016865
PCT Pub. Date: Feb. 5, 2015

(65) Prior Publication Data
US 2016/0140038 A1    May 19, 2016

(51) Int. Cl.
*G06F 8/65*    (2018.01)
*G06F 11/14*   (2006.01)
(Continued)

(52) U.S. Cl.
CPC .......... *G06F 12/0653* (2013.01); *G06F 8/65* (2013.01); *G06F 11/1417* (2013.01);
(Continued)

(58) Field of Classification Search
None
See application file for complete search history.

(56) References Cited

U.S. PATENT DOCUMENTS 6,216,175 B1 *  4/2001  Sliger .................... G06F 8/68
                                                   341/106
2003/0135845 A1   7/2003  Nunomura
(Continued)

FOREIGN PATENT DOCUMENTS

CN     1495610        5/2004
EP     2124151 A1    11/2009
(Continued)

OTHER PUBLICATIONS

"Nuera—Failsafe Boot", < http://www.wake-technology.com/projects/19-nuera/12-nuera-failsafe-boot.html >, 2012.

*Primary Examiner* — Michael Alsip
*Assistant Examiner* — Ralph A Verderamo, III
(74) *Attorney, Agent, or Firm* — Trop, Pruner & Hu P.C.

(57) ABSTRACT

A second physical-address-dependent code is generated from a first physical-address-dependent code using differential data, where the generating comprises converting a first physical address in a region of the first physical-address-dependent code to a second, different physical address for inclusion in a corresponding region of the second physical-address-dependent code.

18 Claims, 5 Drawing Sheets

(51) Int. Cl.
*G06F 12/06* (2006.01)
*G06F 21/57* (2013.01)
*G06F 8/658* (2018.01)
*G06F 9/4401* (2018.01)

(52) U.S. Cl.
CPC .......... *G06F 21/575* (2013.01); *G06F 8/658* (2018.02); *G06F 9/4401* (2013.01); *G06F 2212/1008* (2013.01); *G06F 2221/033* (2013.01)

(56) References Cited

U.S. PATENT DOCUMENTS

| | | | | |
|---|---|---|---|---|
| 2004/0054883 | A1* | 3/2004 | Goodman | G06F 8/65 713/1 |
| 2004/0133771 | A1* | 7/2004 | King | G06F 8/65 713/100 |
| 2005/0060528 | A1 | 3/2005 | Kim | |
| 2005/0273588 | A1 | 12/2005 | Ong et al. | |
| 2007/0106890 | A1 | 5/2007 | Kwon | |
| 2010/0332759 | A1* | 12/2010 | Vauclair | G06F 21/14 711/125 |
| 2012/0151201 | A1 | 6/2012 | Clerc et al. | |
| 2012/0331454 | A1 | 12/2012 | Cross et al. | |
| 2013/0097393 | A1* | 4/2013 | Ninomiya | G06F 13/28 711/154 |

FOREIGN PATENT DOCUMENTS

| | | |
|---|---|---|
| WO | WO 2004/023289 | 3/2004 |
| WO | WO 99/54816 | 10/2009 |

\* cited by examiner

GENERATING A SECOND CODE FROM A FIRST CODE

BACKGROUND

A computing system can include code to perform various startup functions of the computing system. This code can include Basic Input/Output System (BIOS) code. BIOS code can be the target of tampering, such as due to tampering by malware in the computing system or by another entity.

As a result of tampering or other system error, the BIOS code can become compromised. In some cases, multiple images of BIOS code can be stored in a computing system to allow for recovery from compromise of one of the images of the BIOS code. If a first BIOS code image were to become compromised, then a second BIOS code image can be used to allow the computing system to continue operations.

BRIEF DESCRIPTION OF THE DRAWINGS

Some implementations are described with respect to the following figures.

DETAILED DESCRIPTION

Figure 1:
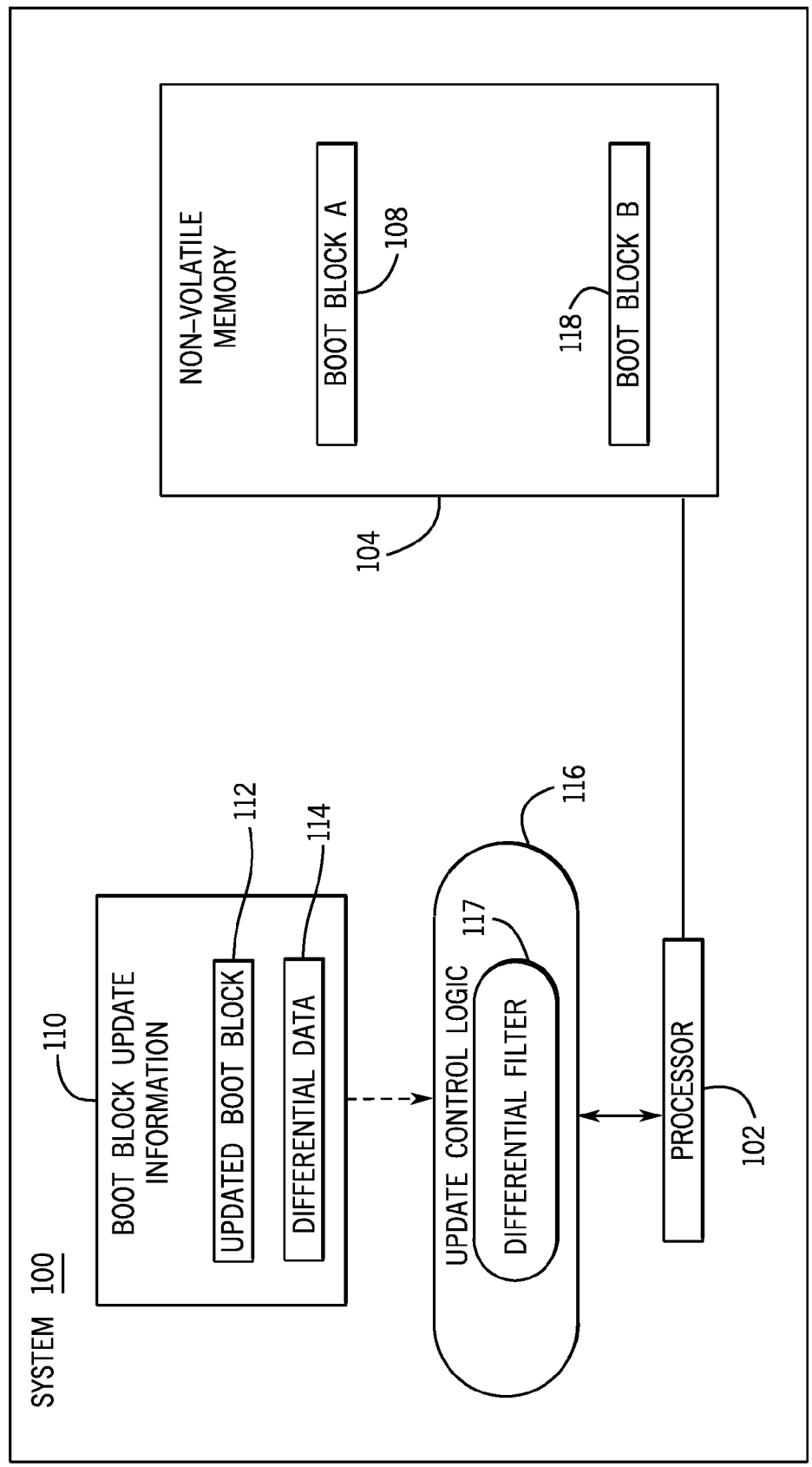
FIG. 1 is a block diagram of an example system including a differential filter according to some implementations.

System code used to perform startup of a computing system can include system firmware, which can be in the form of machine-readable instructions executable on a processor (or processors) of the computing system. "System firmware" can refer to any machine-readable instructions that are able to perform startup of a computing system. Examples of computing systems include desktop computers, notebook computers, tablet computers, personal digital assistants (PDAs), smartphones, game appliances, server computers, storage nodes, network communication nodes, and so forth.

System firmware can include Basic Input/Output System (BIOS) code, which can initialize various components of the computing system, and load an operating system (OS) of the computing system. The BIOS code can perform checking of hardware components to ensure that the hardware components are present and functioning properly. This can be part of a power-on self-test (POST) procedure, for example. After the POST procedure, the BIOS code can progress through the remainder of a booting sequence, after which the BIOS code can load and pass control to the OS. BIOS code can include traditional BIOS code or Unified Extensible Firmware Interface (UEFI) code. In some examples, the BIOS code can include a runtime portion that is executed after the OS loads.

The system firmware can be stored in non-volatile memory, such as a flash memory or any other persistent memory that is programmable. System firmware may be the subject of tampering by malware or other entities, which can cause the system firmware to be compromised. For example, the system firmware can be corrupted such that it can no longer execute without error, or the system firmware may be modified such that the system firmware performs unauthorized tasks. Another source of compromise of system firmware includes system error, such as a system power loss, during an update procedure for updating the system firmware. As a result of the system error during the update procedure, the system firmware being updated may become unusable.

In some implementations, multiple system firmware images can be stored in the computing system. An image refers to a copy or instance of code. One of the system firmware images is a primary system firmware image, which is executed during normal operations when the primary system firmware image is not compromised. However, if the primary system firmware image becomes compromised, then a secondary system firmware image can be used to continue system operation. Note that in some cases, the secondary system firmware image may become compromised, in which case the primary system firmware image may be used to recover the compromised secondary system firmware image.

Various types of code executable in a computing system can rely on availability of main system memory (distinct from the non-volatile memory) to allow the code to use relocatable (or relative) memory addresses for referencing objects, calling functions, or accessing data. By using relocatable memory addresses, the code does not have to be concerned with the physical memory addresses corresponding to where objects, functions, or data are physically located in memory. If the main system memory is available, then relocatable addresses specified in code loaded into the main system memory can be translated (relocated) to physical addresses.

A relocatable memory address is used to allow code to be located at various physical addresses in memory: relocatable memory addresses are not dependent on information available when the code was built. This relocatable memory address is translated into a physical memory address (by a relocating loader, for example) to access the data at the corresponding physical location stored in physical memory.

For code to use relocatable memory addressing, the main system memory has to be first initialized and available. The relocating loader can include address translation information to translate between relocatable memory addresses and physical memory addresses.

The main system memory is initialized early in a boot procedure. In some implementations, the initialization of the main system memory can be performed by a boot block of the system firmware. The boot block is a first portion of the system firmware that is executed when the computing system starts up. The boot block is executed first before the rest of the system firmware is allowed to execute. The boot block can be used to check the integrity of the system firmware, as well as to perform other initial functions, including the initialization of the main system memory.

In some examples, the boot block is also referred to as a Pre-Extensible Firmware Interface (Pre-EFI) Initialization (PEI) code of the system firmware.

Since the boot block is responsible for initializing the main system memory, an initial portion of the boot block (prior to initialization of the main system memory), which is executed from the non-volatile memory, relies on use of physical memory addresses rather than relocatable memory addresses. The physical memory addresses included in the boot block are fixed at build time of the boot block, and cannot change after building of the boot block.

As discussed above, for enhanced reliability, multiple system firmware images, including multiple images of the boot block, can be stored in the computing system. Including multiple copies of the boot block allows for system recovery using a secondary boot block image if a primary boot block image were to be compromised. The multiple images of the boot block are stored in different parts of memory, and more specifically, in different parts of non-volatile memory. Since the boot block is responsible for initializing the main system memory, a boot block image (or at least a first portion of the boot block image) is unable to rely on relocatable memory addressing to resolve physical addresses of objects, functions, data, and the like, that are referenced in the boot block. Effectively, each boot block image can execute "in place," in other words, from the physical address at which the boot block image was copied at the time that the boot block image was initially installed or later updated. This means that the different images of the boot block have different physical addresses for each object reference, function call, data reference, and the like.

As a result, a simple copy of one boot block image ("source boot block image") to replace another boot block image ("target boot block image") would not result in correct execution, since the two boot block images reference different physical addresses. In other words, if the source boot block image were to be copied into a memory region where the target boot block image to be replaced was stored, then executing the source boot block image from that memory region would result in erroneous operation, since the source boot block image references physical addresses that are different from physical addresses referenced by the target boot block image.

In accordance with some implementations, to address the foregoing, one boot block image can be created from another boot block image by using differential data. When creating a target boot block image from a source boot block image, the differential data can be applied to modify physical addresses in the source boot block mage into physical addresses appropriate for the target boot block image. In addition, in some implementations, the differential data can also be applied to modify other content of the source boot block image, for those regions where the source and target boot block images differ.

Although reference is made to system firmware and boot blocks in the present discussion, it is noted that techniques or mechanisms according to some implementations can be applied to other types of boot code that can be used for performing startup functions of a system.

Additionally, techniques or mechanisms according to some implementations can also be applied to other types of code, if the code is a "physical-address-dependent code." A physical-address-dependent code refers to code that references objects, calls functions, or references data using physical memory addresses instead of relocatable memory addresses.

FIG. 1 is a block diagram of an example system 100, which includes one or multiple processors 102 and a non-volatile memory 104. A processor can include a microprocessor, microcontroller, processor module or subsystem, programmable integrated circuit, programmable gate array, or another control or computing device. The non-volatile memory 104 can include one or multiple memory devices, such as flash memory device(s), disk-based storage device(s), and so forth. The non-volatile memory 104 can be implemented with any storage device (or storage devices) that is (are) able to maintain data stored in the storage device(s) even though power is removed from the system 100.

The non-volatile memory 104 stores system firmware, which includes a boot block 108. In addition, another boot block 118 can also be stored in the non-volatile memory 104. The boot blocks (also referred to as boot block images) 108 and 118 are stored in different memory regions of the non-volatile memory 104. The different memory regions can be in separate memory devices, or in different partitions of the same memory device. The system firmware can further include other portions (not shown) that are stored in the non-volatile memory 104.

The presence of multiple boot blocks 108 and 118 provides for a more reliable and robust system. The boot block 108 can be a primary boot block, while the boot block 118 can be a secondary boot block. If the primary boot block 108 were to be compromised, then the secondary boot block 118 can be used instead to allow the system 100 to continue operation.

System firmware stored in the non-volatile memory 104, including the boot blocks 108 and 118, can be updated. FIG. 1 illustrates an example in which boot block update information 110 for updating a boot block is received by an update control logic 116. Note that the boot block update information 110 can be part of a larger update information for updating other portions of the system firmware. The boot block update information 110 includes an updated boot block 112 and differential data 114.

The updated boot block 112 in the boot block update information 110 can be an updated version of the secondary boot block 118. Upon receipt of the boot block update information 110, the updated boot block 112 along with the differential data 114 can be stored in the non-volatile memory 104, to replace the secondary boot block 118. In this manner, the secondary boot block 118 is effectively updated with the updated boot block 112 in the received boot block update information 110. To conserve space of the non-volatile memory 104, an updated version of the primary boot block 108 is not included in the boot block information 110. Rather, the updated version of the primary boot block 108 is produced from the updated boot block 112, by converting physical address(es) using the differential data 114, as noted above.

Space conservation in the non-volatile memory 104 can be beneficial in cases where the primary boot block 108 (and possibly other portions of the system firmware) is (are) stored in memory region(s) of the non-volatile memory 104 that is (are) locked, such as by a chipset of the system 100. A chipset refers to circuitry of the system 100 to perform specified functions of the computing system 100, such as video functions, bus interface functions, memory controller functions, and so forth. For example, the chipset can include an I/O controller, such as a Platform Controller Hub (PCH) from Intel Corporation. The PCH can include various functions, including a display interface to a graphics subsystem, a system bus interface to a system bus to which various I/O devices can be connected, and so forth. In other examples, other types of I/O controllers can be used.

If the primary boot block 108 is stored in a locked memory region, this memory region is not available to be written (for update) during runtime of the system 100. As a result, the primary boot block 108 cannot be updated during runtime. The locked memory region thus reduces the amount of available space in the non-volatile memory 104 for writing during runtime.

In implementations where the amount of available space of the non-volatile memory 104 is restricted, there may not be sufficient space to write two updated boot block images (one to update the primary boot block 108 and the other to update the secondary boot block 118) into the unlocked regions of the non-volatile memory 104.

In accordance with some implementations, instead of writing two updated boot block images to the non-volatile memory, the update control logic 116 can write a single updated boot block image (the updated boot block 112), along with the differential data 114, which has a smaller size than an updated boot block image, to the unlocked memory regions of the non-volatile memory 104.

Once the updated boot block 112 in the boot block update information 110 is used to replace the secondary boot block 118, a differential filter 117 in the update control logic 116 can use the differential data 114 to create an updated version of the primary boot block 108, where the updated version of the primary boot block is used to replace the primary boot block 108 to complete the boot block update.

The update control logic 116 and differential filter 117 can be implemented as machine-readable instructions executable on the processor(s) 102. The update control logic 116 and differential filter 117 can be part of the system firmware, in some examples. Although the differential filter 117 is depicted as being part of the update control logic 116 in FIG. 1, it is noted that the differential filter 117 can be separate from the update control logic 116 in other examples.

During a boot procedure, the system firmware, including a boot block, the update control logic 116 and differential filter 117, can be executed.

The update control logic 116 first writes the updated boot block 112 and the differential data 114 to the non-volatile memory 104, to replace the secondary boot block 118. Next, the differential filter 117 is able to produce an updated version of the primary boot block 108 from the updated boot block 112, by applying the differential data to the updated boot block 112. Generating the updated version of the primary boot block 108 involves converting one or multiple physical addresses in respective region(s) of the updated boot block 112 into different corresponding physical address(es) that are included in the updated version of the primary boot block 108.

For instance, assume that there are two boot block images, called boot block A and boot block B, and each contains a module referred to as BootStart. The BootStart module is called to start the respective boot block image. The physical address for the BootStart module call in boot block A may be a first physical address (e.g. 0xFFFFFABC), and the physical address for the BootStart module call in boot block B may a second, different physical address (e.g. 0xFFFAB-CDE). Boot block A and boot block B can be started by executing the respective BootStart modules from the corresponding different physical addresses. Although this allows for redundancy of execution (where boot block B can be executed if it is detected that boot block A is compromised), boot block A cannot be recovered from boot block B due to the use of the different physical addresses for the BootStart module, even though the logic in boot block A and boot block B may be identical. Simply copying boot block B to the memory region of boot block A would result in an error when the BootStart module of boot block B is started from the location of boot block A.

Also, build environments frequently construct addressing schemes for data accessed by a boot block that are internally coherent in the boot block. However, when these addressing schemes represent physical addresses rather than relocatable addresses, any address within one region of a boot block image can be different from a corresponding, internally-coherent address located in a corresponding region of another boot block image.

In alternative implementations, instead of updating boot block images using the update control logic 116 and differential filter 117, other types of physical-address-dependent code images can be updated. These physical-address-dependent code images can be stored in the non-volatile memory 104.

Figure 2:
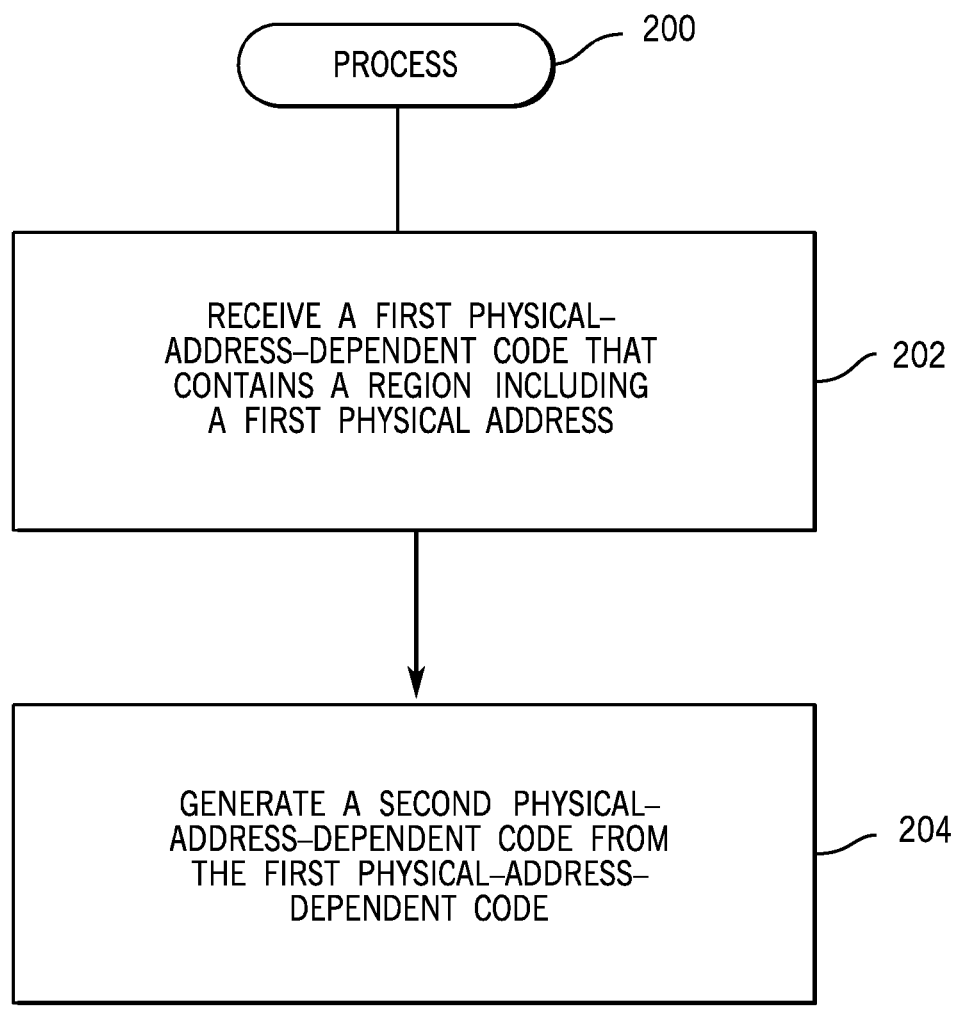
FIGS. 2 and 3 are flow diagrams of processes according to some implementations.

FIG. 2 is a flow diagram of a process 200 according to some implementations, which can be performed by the differential filter 117 of FIG. 1, for example. The process 200 receives (at 202) a first physical-address-dependent code (e.g. updated boot block 112), where the first physical-address-dependent code contains a region including a first physical address.

The differential filter 117 generates (at 204) a second physical-address-dependent code (e.g. updated version of the boot block 108) from the first physical-address-dependent code using differential data (e.g. 114), where the generating includes converting the first physical address in the region of the first physical-address-dependent code to a second, different physical address for inclusion in a corresponding region of the second physical-address-dependent code.

Figure 3:
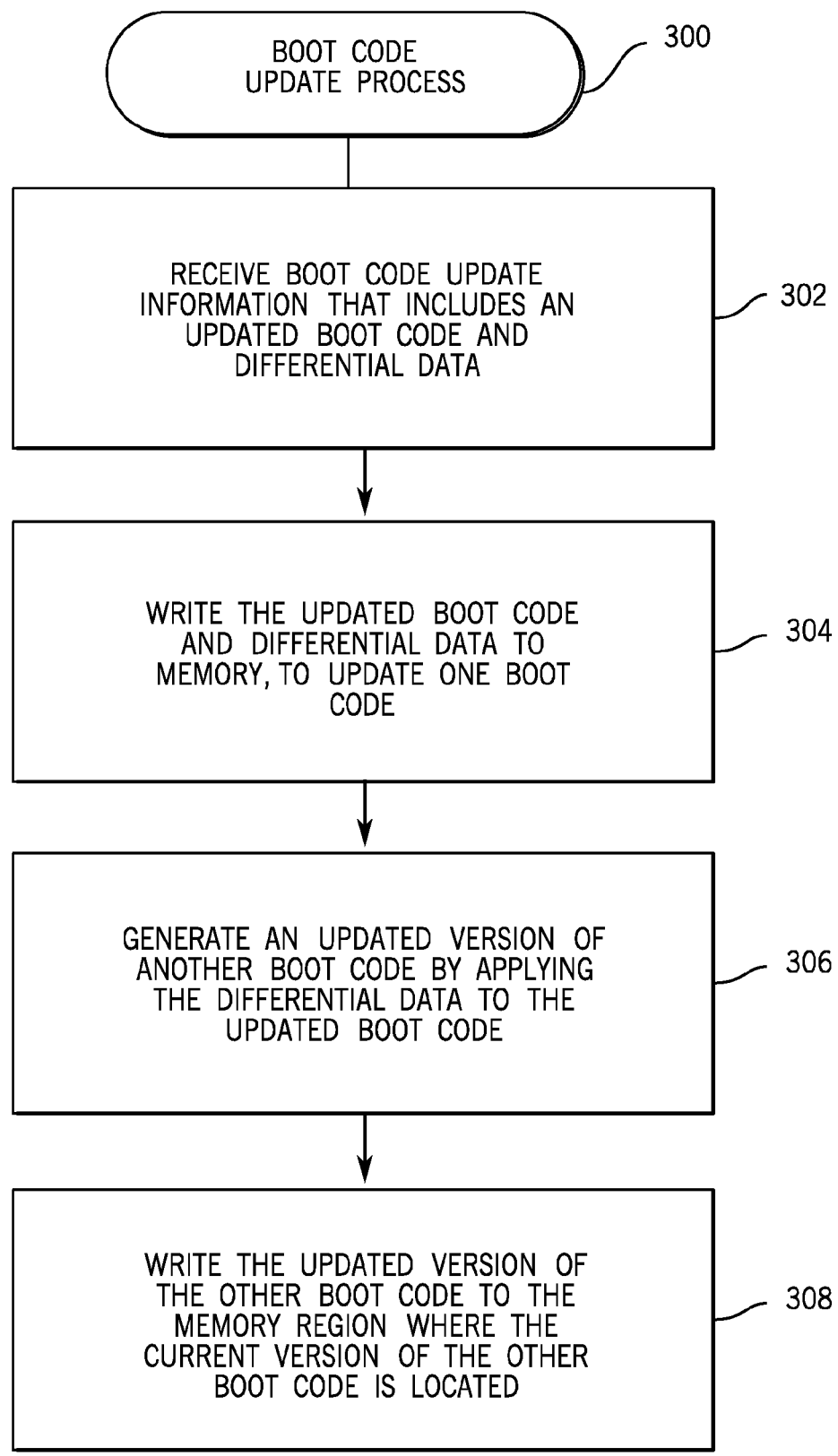

FIG. 3 is a flow diagram of a boot code update process 300 according to some implementations. The update process 300 can be performed by the update control logic 116 and the differential filter 117, for example.

The update process 300 receives (at 302) boot code update information (e.g. 110 in FIG. 1), which includes an updated boot code (e.g. 112 in FIG. 1) and differential data (e.g. 114 in FIG. 1). The update process 300 writes (at 304) the updated boot code and the differential data to memory (e.g. non-volatile memory 104 in FIG. 1). The writing of the updated boot code to the memory replaces (updates) one boot code (e.g. secondary boot block 118 in FIG. 1).

The update process 300 generates (at 306) an updated version of another boot code (e.g. primary boot block 108 in FIG. 1) by applying the differential data to the updated boot code. The update process 300 then writes (at 308) the updated version of the other boot code to the memory region where the current version of the other boot code is located, to replace the current version of the other boot code. Prior to the writing at 308, the memory region may be first unlocked. In this manner, both instances of the boot code in the memory can be updated, using just one updated boot code (along with the differential data).

Any of multiple differencing techniques can be employed by the differential filter 117 to produce one boot block image from another boot block image. In some implementations, a first differencing technique is applied in cases where the boot block images differ in just physical addresses—in other words, there are no differences in other content of the boot block images.

In specific examples, it can be determined that the physical addresses referenced by two boot block images differ in the least significant portion of the physical addresses (e.g. the lowest two bytes of the physical addresses). In such examples, physical addresses referenced in a first region of a first boot block image differ from physical addresses referenced in a corresponding first region of a second boot block image by a constant amount (e.g. a two-byte-length address difference). In some examples, physical addresses referenced in a second region of the first boot block image can differ from physical addresses referenced in a corresponding second region of a second boot block image by a different constant amount.

For instance, in the first regions of boot blocks A and B, the address difference can be 0xE1F. A physical address in the first region of boot block A may be 0xFFFFF02C, and the physical address in the corresponding first region of boot block B may be 0xFFFFE20D (a difference of 0xE1F). In the first region of boot block A, another physical address may be 0xFFFFE02C and the corresponding physical address in the first region of boot block B may be 0xFFFFD20D (still a difference of 0xE1F). However, in second regions of boot blocks A and B, the physical address difference can change to 0xE22.

In the foregoing example, it can be seen that the difference between the physical address in a region of boot block A and a physical address in the corresponding region of boot block B is in the last two bytes of the respective physical addresses (a two-byte-length address difference). However, in other examples, physical addresses in different boot block images may differ by more than two bytes or by less than two bytes.

With the first differencing technique, the differential data (e.g. 114 in FIG. 1) can include a number of entries that correspond to different regions of the boot block images. Each entry specifies a physical address different for a respective region of each of the boot block images. For example, a first entry of the differential data can specify a first physical address difference for first regions of the boot block images, a second entry of the differential data can specify a second physical address difference for second regions of the boot block images, and so forth.

In the foregoing implementations, it is assumed that the differences between boot block images include just differences in physical addresses. In other implementations, it is possible that boot block images can differ in physical addresses, as well as in other content of the boot block images. For example, boot block images can differ in physical locations of strings or other elements contained in respective boot block regions. The strings themselves referred to in the different boot block images may be the same, but their locations in the boot block regions are different.

In these latter implementations, a second differencing technique can be used, in which a different type of differential data can be applied by the differential filter 117 (FIG. 1). In such implementations, the differential data can be divided into multiple sections, including sections where the content of respective regions of the boot block images are the same, and sections where the content of respective regions of the boot block images are different.

Figure 4:
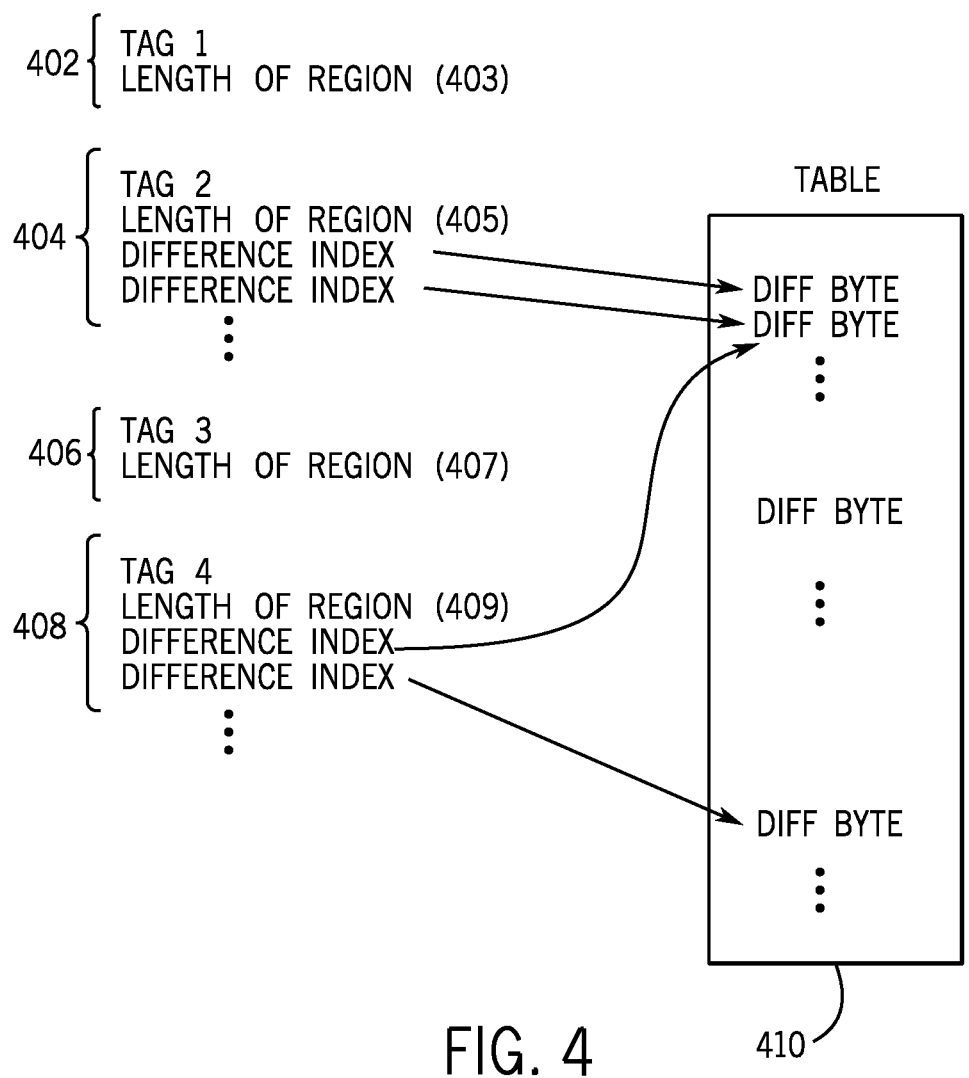
FIG. 4 is a schematic diagram of an example differential data according to some implementations.

FIG. 4 illustrates an example of the differential data 114 that can be used by the second differencing technique. The differential data 114 of FIG. 4 includes separation tags (tags 1, 2, 3, and 4 shown) that separate different sections 402, 404, 406, and 408 of the differential data 114. The separation tags can be a specified value, e.g. 0xFF. In other examples, the separation tags can be a different value.

Tag 1 identifies a first section 402 of the differential data 114 corresponding to first regions of the boot block images that have the same content. The first section 402 also specifies a length 403 (e.g. number of bytes) of each of the first regions of the boot block images.

Tag 2 identifies a second section 404 of the differential data 114 corresponding to second regions of the boot block images that have different content. The second section 404 also specifies a length 405 (e.g. number of bytes) of the second regions of the boot block images.

Tag 3 identifies a third section 406 of the differential data 114 corresponding to third regions of the boot block images that have the same content. The third section 406 also specifies a length 407 (e.g. number of bytes) of the third regions of the boot block images.

Tag 4 identifies a fourth section 408 of the differential data 114 corresponding to fourth regions of the boot block images that have different content. The fourth section 408 also specifies a length 409 (e.g. number of bytes) of the fourth regions of the boot block images.

In addition, the second section 404 also includes information describing the differences in content in the second regions of the boot block images. In some implementations, instead of including the differences in content in the second section 404 of the differential data 114, one or multiple indexes can be included in the second section. Each index points to a respective location in another data structure 410 (e.g. a table) that contains the differences in content (depicted as "diff byte" or "difference byte" in FIG. 4).

The fourth section 408 also includes information describing the differences in content in the fourth regions of the boot block images. The fourth section 408 further includes indexes pointing to entries of the data structure 410.

In examples where the separation tags (e.g. tags 1, 2, 3, and 4) are specified with the value 0xFF, the length information (e.g. 403, 405, 407, and 409 is encoded using base 15 to prevent any possible collision with the separation tag. Base 15 allows the highest nibble of any number to be 0xE rather than 0xF. Encoding with base 16, on the other hand, would allow the highest nibble to have value 0xF. By using base 15 encoding, the maximum value of any nibble of the length information (403, 405, 407, or 409) is 0xE, which ensures that the length information would not have a value that collides with 0xFF (the value of the separation tags in some examples).

In the data structure 410, the actual content of the boot block images is not kept, but rather the difference between the content of the boot block images. In some examples, each entry of the data structure 410 includes a value that is the difference of a byte in the first boot block image and the corresponding byte in the second boot block image. In examples where the differential data 114 is used to track differences in bytes of the boot block images, there can be up to 255 difference values in the data structure 410. For example, one entry of the data structure 410 can specify a difference value of 0x35, another entry of the data structure 410 can specify a difference value of 0x8C, and so forth, from the range of 0x01 to 0xFE. The entries of the data structure 410 do not have to specify difference values in sequential increasing or decreasing order. Instead, the entries of the data structure 410 can be created at build time in an order that byte differences were detected.

Collision of an entry of the data structure 406 with the separation tag (e.g. 0xFF) can be avoided since there can only be up to 255 difference values between any single byte of one boot block image and another boot block image. The 256$^{th}$ difference value is, by definition, the same byte, i.e. a difference of zero.

If regions of the boot block images contain the same content (same bytes) then a section such as section 402 or 406 in the differential data 114 is used to specify the length (e.g. number of bytes) of each such regions of the boot block images that have the same content.

As noted above, the indexes that are included in the second or fourth section 404 or 408 are arranged such that the indexes would not conflict with a value (e.g. 0xFF) representing the separation tags. For example, the indexes can be zero-based indexes (indexes that start at zero), such that the index to the 255$^{th}$ byte difference is 0xFE instead of 0xFF.

The differential data 114 of FIG. 4 can be used to create a second boot block image from a first boot block image by adding the differential data 114 to the first boot block image. Alternatively, the first boot block image can be created from the second boot block image by subtracting the differential data 114 from the second boot block image.

Figure 5:
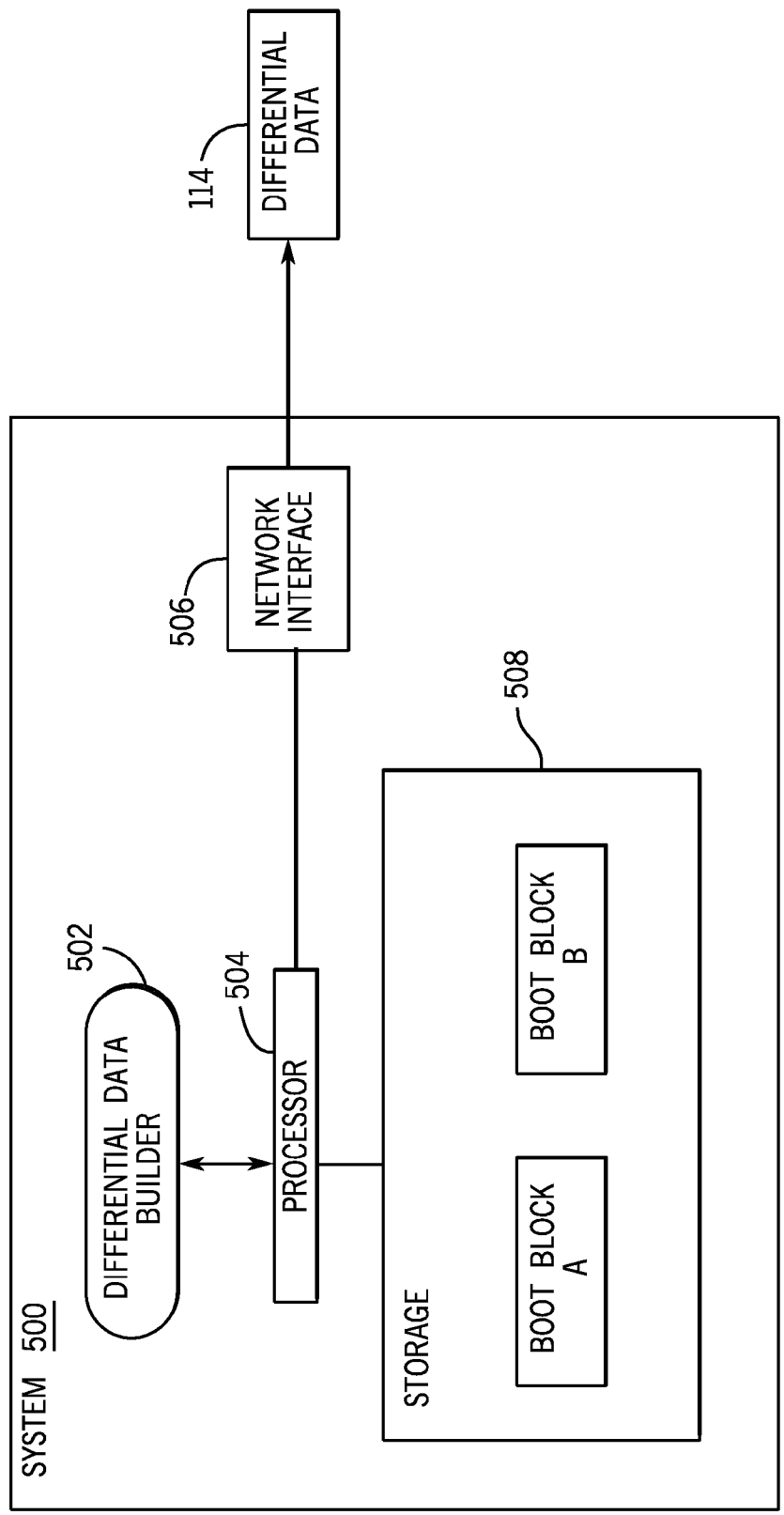
FIG. 5 is a block diagram of an example system including a differential data builder according to further implementations.

FIG. 5 is a block diagram of an example system 500 that includes a differential data builder 502 implemented as machine-readable instructions that are executable on one or multiple processors 504. The system 500 further includes a network interface 506 (to allow the system 500 to communicate over a network) and a storage medium (or storage media) 508.

The storage medium (or storage media) 508 can store multiple boot block images (e.g. boot block A and boot block B). The differential data builder 502 is able to compare boot block A and boot block B to create the differential data 114, which can be sent to the system 100 of FIG. 1. The created differential data 114 can be differential data that identifies just physical address differences, for instances where boot blocks A and B differ in just physical addresses. Alternatively, the created differential data 114 can be the differential data 114 of FIG. 4, for instances where boot blocks A and B differ in physical addresses as well as other content.

Although the system 500 is depicted as being separate from the system 100 it is noted that the system 100 and 500 may be the same system in other examples.

Data and instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
receiving, by a system having a processor, a first physical-address-dependent code, the first physical-address-dependent code containing a first region including a first physical address, and a second region including a second physical address; and
generating, by the system, a second physical-address-dependent code from the first physical-address-dependent code using differential data that comprises a first entry specifying a first physical address difference and a second entry specifying a second physical address difference different from the first physical address difference, the first physical address difference based on a difference in value between the first physical address and another physical address, and the second physical address difference based on a difference in value between the second physical address and another physical address, wherein the generating comprises:
converting, by combining the first physical address difference of the first entry with the first physical address in the first region of the first physical-address-dependent code, the first physical address to a different physical address for inclusion in a corresponding first region of the second physical-address-dependent code, and
converting, by combining the second physical address difference of the second entry with the second physical address in the second region of the first physical-address-dependent code, the second physical address to a different physical address for inclusion in a corresponding second region of the second physical-address-dependent code.

2. The method of claim 1, wherein receiving the first physical-address-dependent code comprises receiving a first boot code, and wherein generating the second physical-address-dependent code comprises generating a second boot code.

3. The method of claim 1, further comprising updating a current version of the second physical-address-dependent code with the generated second physical-address-dependent code.

4. The method of claim 1, wherein generating the second physical-address-dependent code from the first physical-address-dependent code using the differential data further comprises modifying other content of the first physical-address-dependent code to produce the second physical-address-dependent code.

5. The method of claim 4, wherein the differential data identifies a plurality of differences in content between the first physical-address-dependent code and the second physical-address-dependent code.

6. The method of claim 5, wherein the differential data includes indexes to entries of a data structure that includes the plurality of differences in content.

7. The method of claim 6, wherein the differential data further includes separation tags identifying respective sections of the differential data, wherein a first section of the sections corresponds to regions of the first physical-address-dependent code and the second physical-address-dependent code that are identical, and the sections further comprise the first and second entries that include the indexes.

8. The method of claim 1, further comprising:
storing, in a memory, a primary code and a secondary code, the primary code comprising the second physical-address-dependent code, and the secondary code useable to provide system recovery in case of compromise of the primary code;
replacing, in the memory, the secondary code with the first physical-address-dependent code that comprises update code for the secondary code; and
updating, in the memory, the primary code using the second physical-address-dependent code and the differential data.

9. The method of claim 1, wherein the first physical-address-dependent code comprises an element at a first physical location in the first physical-address-dependent code, wherein the differential data includes a third entry comprising information regarding a difference in a physical location of the element, and wherein the generating comprises using the information regarding the difference in the physical location of the element to change a physical location of the element in the second physical-address-dependent code.

10. The method of claim 1, wherein the first physical address difference is based on a difference in value between the first physical address and a physical address in the corresponding first region of the second physical-address-dependent code, and the second physical address difference is based on a difference in value between the second physical address and a physical address in the corresponding second region of the second physical-address-dependent code.

11. A system comprising:
a memory to store a current version of a first boot code and an additional boot code that is useable to provide system recovery in case of compromise of the first boot code;
at least one processor; and
update control logic executable on the at least one processor to:
receive boot code update information including an updated boot code and differential data, wherein the updated boot code is an updated version of the additional boot code, and the differential data comprises a first entry specifying a first physical address difference and a second entry specifying a second physical address difference different from the first physical address difference, the first physical address difference based on a difference in value between a first physical address in a first region of the updated boot code and another physical address, and the second physical address difference based on a difference in value between a second physical address in a second region of the updated boot code and another physical address;
generate an updated version of the first boot code from the updated boot code using the differential data, the generating comprising:
combining the first physical address difference of the first entry with the first physical address in the first region of the updated boot code, to convert the first physical address to a different physical address for inclusion in a corresponding first region of the updated version of the first boot code, and
combining the second physical address difference of the second entry with the second physical address in the second region of the updated boot code, to convert the second physical address to a different physical address for inclusion in a corresponding second region of the updated version of the first boot code; and
replace the additional boot code in the memory with the updated boot code.

12. The system of claim 11, wherein the differential data identifies differences in content between the first boot code and the updated boot code.

13. The system of claim 11, wherein a memory region of the memory to store the current version of the first boot code is a locked memory region during runtime of the system.

14. The system of claim 11, wherein the current version of the first boot code is a current boot block executable on the at least one processor to initialize the memory, and wherein the updated version of the first boot code is an updated boot block.

15. The system of claim 11, wherein the first physical address difference is based on a difference in value between the first physical address and a physical address in the corresponding first region of the updated version of the first boot code, and the second physical address difference is based on a difference in value between the second physical address and a physical address in the corresponding second region of the updated version of the first boot code.

16. A non-transitory machine-readable storage medium storing instructions that upon execution cause a system to:
determine, based on a first physical-address-dependent code and a second physical-address-dependent code, a differential data, the first physical-address-dependent code containing a first region including a first physical address, and a second region including a second physical address,
wherein the differential data includes information to generate the second physical-address-dependent code from the first physical-address-dependent code, the information comprising a first entry specifying a first physical address difference and a second entry specifying a second physical address difference different from the first physical address difference, the first physical address difference based on a difference in value between the first physical address and another physical address, and the second physical address difference based on a difference in value between the second physical address and another physical address, wherein the generating comprises combining the first physical address difference of the first entry with the first physical address in the first region of the first physical-address-dependent code, to convert the first physical address to a different physical address for inclusion in a corresponding first region of the second physical-address-dependent code, and combining the second physical address difference of the second entry, the second physical address in the second region of the first physical-address-dependent code, to convert the second physical address to a different physical address for inclusion in a corresponding second region of the second physical-address-dependent code.

17. The article of claim 16, wherein the first physical-address-dependent code comprises a first boot code, and the second physical-address-dependent code comprises a second boot code.

18. The non-transitory machine-readable storage medium of claim 16, wherein the first physical-address-dependent code comprises an element at a first physical location in the first physical-address-dependent code,
wherein the differential data includes a third entry comprising information regarding a difference in a physical location of the element, and
wherein the generating comprises using the information regarding the difference in the physical location of the element to change a physical location of the element in the second physical-address-dependent code.

* * * * *

UNITED STATES PATENT AND TRADEMARK OFFICE
CERTIFICATE OF CORRECTION

PATENT NO. : 10,360,148 B2
APPLICATION NO. : 14/892220
DATED : July 23, 2019
INVENTOR(S) : Baraneedharan Anbazhagan et al.

Page 1 of 1

It is certified that error appears in the above-identified patent and that said Letters Patent is hereby corrected as shown below:

In the Claims

In Column 12, Line 49, Claim 17, delete "The article of claim 16," and insert -- The non-transitory machine-readable storage medium of claim 16, --, therefor.

Signed and Sealed this
First Day of October, 2019

Andrei Iancu
*Director of the United States Patent and Trademark Office*